US011528517B2

(12) United States Patent
Webb

(10) Patent No.: US 11,528,517 B2
(45) Date of Patent: *Dec. 13, 2022

(54) SYSTEMS AND METHODS FOR OPERATING A STREAMING SERVICE TO PROVIDE COMMUNITY SPACES FOR MEDIA CONTENT ITEMS

(71) Applicant: Sony Interactive Entertainment LLC, San Mateo, CA (US)

(72) Inventor: Jonathan Webb, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,831

(22) Filed: Jul. 20, 2020

(65) Prior Publication Data

US 2020/0351528 A1 Nov. 5, 2020

Related U.S. Application Data

(63) Continuation of application No. 15/619,397, filed on Jun. 9, 2017, now Pat. No. 10,721,503.

(51) Int. Cl.
*H04N 21/235* (2011.01)
*H04N 21/472* (2011.01)
(Continued)

(52) U.S. Cl.
CPC ......... *H04N 21/2353* (2013.01); *H04L 65/75* (2022.05); *H04N 21/235* (2013.01);
(Continued)

(58) Field of Classification Search
CPC .................................................. H04N 21/2353
See application file for complete search history.

(56) References Cited

U.S. PATENT DOCUMENTS 8,132,200 B1 * 3/2012 Karam ............... H04N 21/4826
725/24
9,894,415 B2 * 2/2018 Knox ................... H04N 21/251
(Continued)

FOREIGN PATENT DOCUMENTS

| EP | 2437464 A1 | 4/2012 |
| JP | 2011-216930 A | 10/2011 |
| JP | 2012-114525 A | 6/2012 |

OTHER PUBLICATIONS

PCT/US2018/036260, International Search Report and Written Opinion.

*Primary Examiner* — Hsiungfei Peng
*Assistant Examiner* — Fred Peng
(74) *Attorney, Agent, or Firm* — Penilla IP, APC

(57) ABSTRACT

A community space is established for a media content item. Data items are received from contributing account holders. Each data item has metadata including an index time corresponding to a time of relevance of the data item during playback of the media content item. Each data item is separate from the media content item. The data items and their associated metadata are stored within the community space in correlation with the media content item. A streaming request for the media content item is received from a requesting account holder. The media content item is streamed to a device of the requesting account holder in response to the streaming request. At least some of the data items and their associated metadata correlated with the media content item are transmitted from the community space to the requesting account holder in conjunction with streaming the media content item to the requesting account holder.

22 Claims, 11 Drawing Sheets

(51) Int. Cl.
*H04N 21/4788* (2011.01)
*H04N 21/81* (2011.01)
*H04L 65/75* (2022.01)

(52) U.S. Cl.
CPC ....... *H04N 21/472* (2013.01); *H04N 21/4788* (2013.01); *H04N 21/8133* (2013.01)

(56) References Cited

U.S. PATENT DOCUMENTS

| | | |
|---|---|---|
| 9,924,236 B2* | 3/2018 | Nguyen ............. H04N 21/4314 |
| 2011/0107369 A1 | 5/2011 | O'Brien et al. |
| 2015/0139610 A1* | 5/2015 | Syed ....................... G11B 27/11 |
| | | 386/241 |
| 2017/0006074 A1* | 1/2017 | Oates, III ............ H04L 65/4076 |
| 2018/0054320 A1* | 2/2018 | Harpur .................... H04L 51/04 |

* cited by examiner

SYSTEMS AND METHODS FOR OPERATING A STREAMING SERVICE TO PROVIDE COMMUNITY SPACES FOR MEDIA CONTENT ITEMS

CLAIM OF PRIORITY

This application is a continuation application under 35 U.S.C. 120 of prior U.S. application Ser. No. 15/619,397, filed Jun. 9, 2017, the disclosure of which is incorporated herein by reference in its entirety for all purposes.

BACKGROUND

Video streaming has become a mainstream option for consumers to receive media content. Some modern streaming systems, such as the PlayStation™ Vue service provide streaming of live television, movies, and sports events to electronic devices of service subscribers. Such streaming systems can provide real-time content as well as premium third party content, as well as archived content. Also, such streaming systems can provide for saving of enormous amounts of video content within the cloud without recording conflicts. It is within this context that the present invention arises.

SUMMARY

In an example embodiment, a method includes establishing a community space for a media content item. The method also includes receiving one or more data items from one or more contributing account holders. Each of the one or more data items has metadata including an index time corresponding to a time of relevance of the data item during playback of the media content item. Each of the one or more data items is separate from the media content item. The method also includes storing the one or more data items and associated metadata within the community space in correlation with the media content item. The method also includes receiving a streaming request for the media content item from a requesting account holder. The method also includes streaming the media content item to a device of the requesting account holder in response to the streaming request. The method also includes transmitting at least some of the one or more data items and associated metadata correlated with the media content item from the community space to the device of the requesting account holder in conjunction with streaming the media content item to the device of the requesting account holder.

Other aspects of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the presented subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
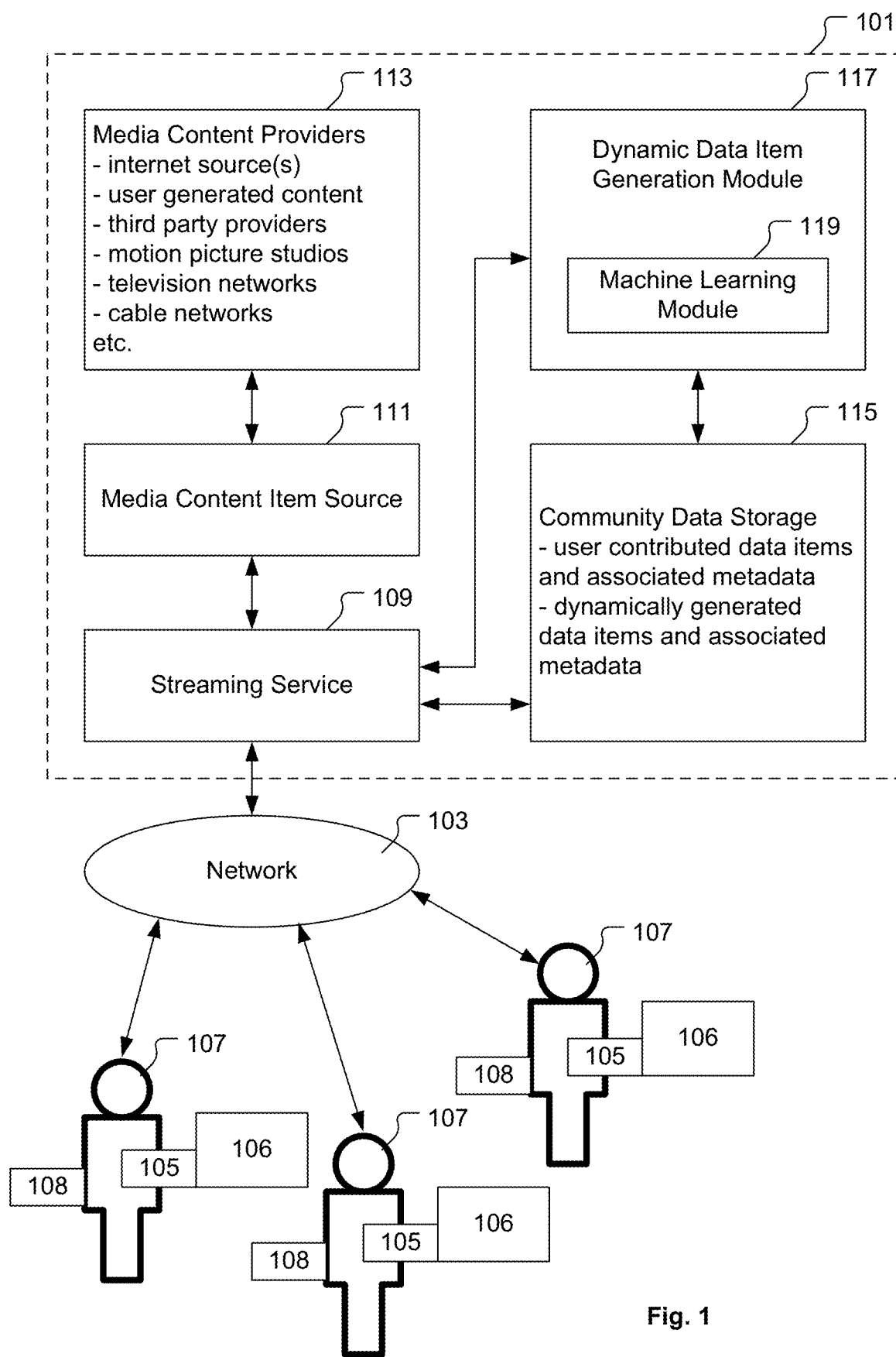
FIG. 1 shows a video streaming system for providing streaming media content over a network to electronic devices of a number of account holders, in accordance with some embodiments of the present invention

FIG. 1 shows a video streaming system 101 for providing streaming media content over a network 103 to electronic devices 105 of a number of account holders 107, in accordance with some embodiments of the present invention. In some embodiments, the video streaming system 101 is implemented within a cloud computing architecture. The video streaming system 101 includes a streaming service 109 configured to receive requests for media content from the devices 105 of the account holders 107, by way of network 103, and further configured to stream requested media content to the electronic devices 105 of the account holders 107, by way of network 103, upon verification of the account holder 107 as being authorized to access and receive the media content. Then, the electronic device 105 can be operated to play the streaming media content on a display 106 of the account holder 107. In some embodiments, the electronic device 105 and the display 106 are integrated together into a single device, such as within a television system. It should be understood that the network 103 represents any combination of any types of wired and/or wireless digital data communication networks, including but not limited to Wi-Fi network(s), Bluetooth network(s), cellular network(s), cable network(s), satellite network(s), optical communication network(s), among other types of networks. The media content can be any type of audio/video content, including streaming video. In some embodiments, the streaming video accessible through the streaming service 109 is one or more of a movie, a television show, a sportscast, an independent video, and a computer-generated video, e.g., game video, among others.

The streaming service 109 is configured to establish and maintain secured accounts for the various account holders 107 for purposes of maintaining credentials for access authorization by the account holders 107, tracking of account holder 107 preferences, and billing for services provided to the account holders 107, among other functions. The streaming service 109 is configured to expose an application programming interface (API) that can be used by software executing on the electronic devices 105 of the account holders 107 to access and execute various functions of the streaming service 109 exposed for public use, such as logging into an account of the account holder 107, requesting performance of an action by the streaming service 109 (e.g., streaming a requested media content item, etc.), requesting information about the account of the account holder 107, and uploading information and/or content to the streaming service 109, among other functions.

The streaming service 109 is connected in data communication with a media content item source 111 configured to provide requested media content items to the streaming service 109. In some embodiments, the media content item source 111 includes a database of media content items that can be queried to obtain a particular media content item for streaming to the electronic devices 105 of the account holder 107. In some embodiments, the media content item source 111 includes a number of data storage devices and/or data memory devices for storing media content items for rapid acquisition by the streaming service 109. The media content item source 111 is configured to receive media content items from a number of media content providers 113, including but not limited to internet source(s), user generated content, third party provider(s), motion picture studio(s), television network(s), and cable network(s), among others. In some embodiments, the media content item source 111 is configured to expose an API that can be used by software executing on electronic devices of the media content providers 113 to enable uploading of media content items to the media content item source 111, to enable access to media content items held by a media content provider 113, and to enable bi-directional communication of data associated with media content items between the media content providers 113 and the media content item source 111.

In some embodiments, the streaming service 109 is configured to provide an account log-in dialog for display on the electronic device 105 of the account holder 107 through which the account holder 107 can enter their credentials to log into the streaming service 109 and gain access to the media content items available for streaming. In some embodiments, a token can be stored on the electronic device 105 of the account holder 107 to enable automatic validation of the account holder 107 by the streaming service 109 upon an attempt by the account holder 107 to access the streaming service 109 using the electronic device 105. In some embodiments, the streaming service 109 can require the electronic device 105 to provide its current terrestrial location to the streaming service 109, such as by transmitting latitude and longitude coordinates, as part of validation of the account holder 107 by the streaming service 109 to help ensure that the electronic device 105 is being used by the actual account holder 107 that has paid for the streaming service 109.

In some embodiments, once the account holder 107 is successfully logged into the streaming service 109, the streaming service 109 is configured to provide a navigable/selectable menu of available services for display on the electronic device 105 of the account holder 107. In some embodiments, the menu of available services includes access to a listing of media content items available for streaming. In various embodiments, the media content items can be categorized and/or sorted to facilitate location of a particular media content item by the account holder 107. Upon selection of a particular media content item for streaming, the streaming service 109 operates to retrieve the particular media content item from the media content item source 111 and stream the particular media content item to the electronic device 105 of the account holder 107 for viewing on the display 106 of the account holder 107.

Also, in some embodiments, the menu of available services provided by the streaming service 109 can include an account holder preferences section within which the account holder can specify their preferences with regard to how the streaming service 109 provides service the account holder 107. In some embodiments, the account holder preferences section includes a selectable preference for enabling/disabling a "community space" for a streamed media content item when available. Also, in some embodiments, the account holder can enable/disable a community space for a streamed media content item using a controller or other input device while actively viewing the streamed media content item. In general, the community space for a given streamed media content item is a data store of information and/or supplemental content provided from sources separate from the given streamed media content item, where the information and/or supplemental content is time-indexed to playback of the streamed media content item.

Figure 2:
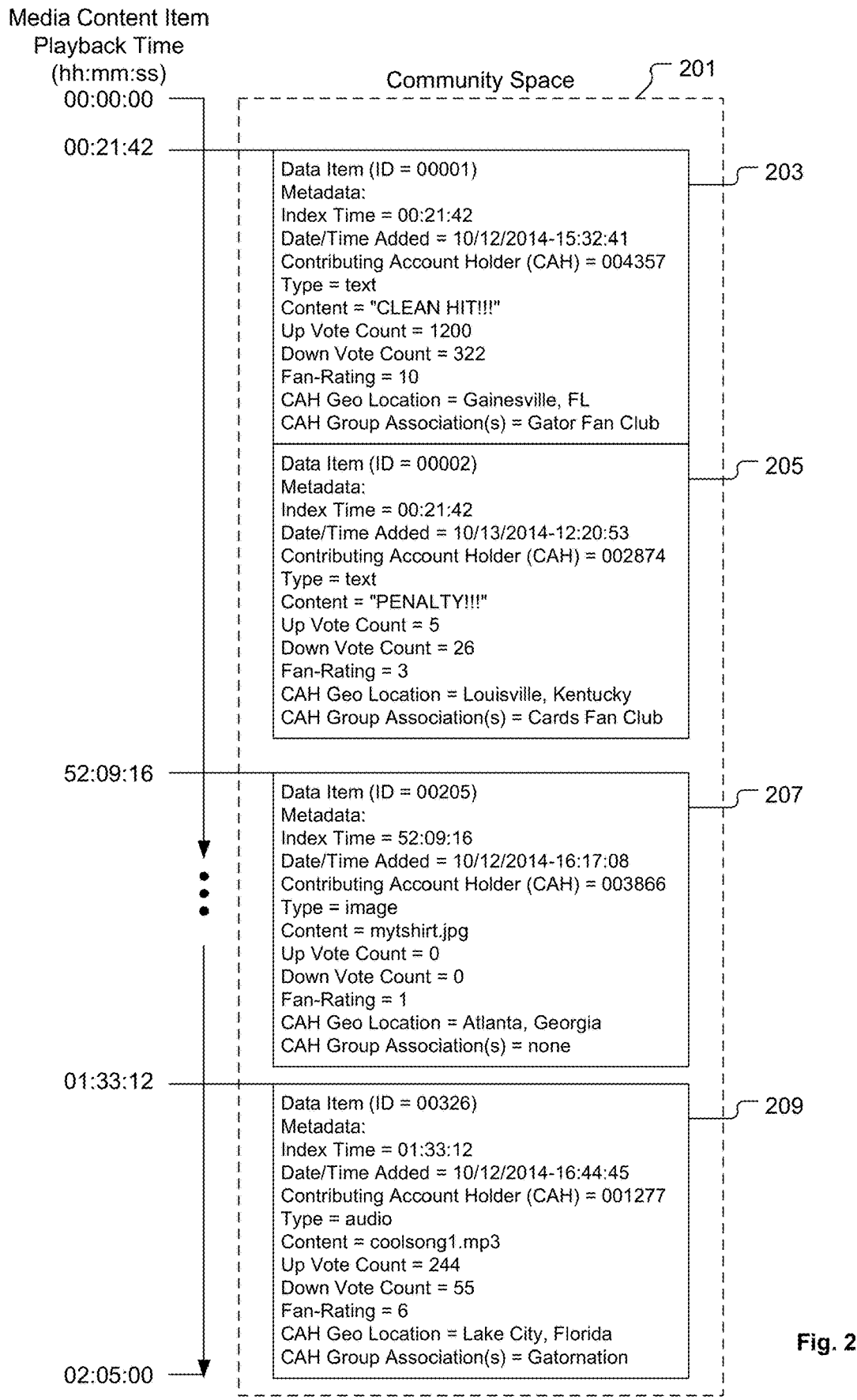
FIG. 2 shows a diagram illustrating an example of a community space for a given streamed media content item, in accordance with some embodiments of the present invention.

FIG. 2 shows a diagram illustrating an example of a community space 201 for a given streamed media content item, in accordance with some embodiments of the present invention. In some embodiments, the community space 201 is generated upon the initial airing/showing of the media content item. In some embodiments, the community space 201 is generated in advance of the initial airing/showing of the media content item, with the community space 201 exposed in a discoverable manner so that verified users of the streaming service 109 can discover and utilize the community space 201 in anticipation of the corresponding media content item becoming available for viewing. In some embodiments, the community space 201 includes information and/or supplemental content provided by contributing account holders 107 to the streaming service 109 as they play back the media content item. The example of FIG. 2 shows four data items 203, 205, 207, 209 contributed to the community space 201 by account holders 107 during their respective playback of the media content item to which the community space 201 is associated. It should be understood that the community space 201 can include an unlimited number of data items from an unlimited number of data item contributors.

In the example of FIG. 2, each data item 203, 205, 207, 209 is assigned a data item identifier (ID) when it is added to the community space 201. Also, in the example of FIG. 2, the metadata for each data item includes an index time indicating a time during playback of the media content item to which the data item is related. In this manner, each data item 203, 205, 207, 209 is temporally indexed to a respective time during playback of the media content item. For example, data item 203 has an index time of 00:21:42, which means that the data item 203 corresponds to the time 00:21:42 during playback of the media content item. Also, in the example of FIG. 2, the metadata for each data item includes a date and time when the data item was added to the community space 201. For example, the data item 203 was added to the community space on Oct. 12, 2014, at 15:32:41 hours. Also, the date and time can be based on a specified time zone.

In the example of FIG. 2, the metadata for each data item includes an identity of the contributing account holder (CAH), who is the account holder registered with the streaming service 109 that contributed, i.e., added and/or uploaded, the data item to the community space 201. In some embodiments, the identity of the CAH is generated and maintained by the streaming service 109 when the CAH registers with the streaming service 109. In some embodiments, the identity of the CAH is an identification number assigned to the CAH when they registered with the streaming service 109. The streaming service 109 can receive and maintain information about each account holder, such as public user name, legal user name, billing information, and preferences for various options provided by the streaming service 109, among essentially any other information about the account holder related to their use of the streaming service 109. Using the identity of the CAH, the streaming service 109 can correlate each data item 203, 205, 207, 209 within the community space 201 to an actual registered account holder. This can be leveraged by the streaming service 109 to review content within the community space 201 for compliance with established rules of conduct and remove/block content that violates established rules of conduct and to track how account holders utilize the streaming service 109 to provide an improved experience for individual account holders.

In the example of FIG. 2, the metadata for each data item also includes a specification of the type of data item. In various embodiments, the community space 201 can be configured to accept and include one or more types of data items, including but not limited to text (such as for a text message), an image, a graphic, a photograph, an audio recording, a video clip, a music file, a universal resource locator (URL), etc. In some embodiments, the metadata for each data item may include the actual content of the data item, or include a reference to a location of the actual content of the data item, such as a reference to a location in a content download network (CDN) or other cloud storage service. For example, in FIG. 2, the data item 203 is of type "text," and the content of the data item 203 includes the actual text "CLEAN HIT!!!" for the data item 203 as provided by the CAH. The content of the data item is based on the type of data item. For example, in FIG. 2, data item 207 is of the type "image" and the content of the data item 207 is a filename "mytshirt.jpg" for the image that defines the data item 207. And, similarly, the data item 209 in the example of FIG. 2 is of the type "audio" and the content of the data item 209 is a filename "coolsong1.mp3" for the audio that defines the data item 209. Again, it should be understood that the community space 201 can be configured to receive and include any type of data item and corresponding content that can be displayed and/or played during streaming of the media content item to which the data item is associated.

In the example of FIG. 2, the metadata for each data item also includes an up-vote count tally and a down-vote count tally. In some embodiments, when each data item is displayed in conjunction with streaming of the media content item by an account holder 107, the account holder 107 is able to provide input as to whether they like or dislike the data item. Each like of the data item contributes to the up-vote count tally, and each dislike of the data item contributes to the down-vote tally. The community space 201 display preferences for a given account holder can be set to toggle on/off a display of the up-vote count tally and down-vote count tally for the data items. In some embodiments, the streaming service 109 can use the up-vote count tally and down-vote count tally for a given data item in a function for generating a fan-rating for the CAH for the given data item. In some embodiments, the metadata for each data item can include the fan-rating for the CAH for the data item. And, in some embodiments, the fan-ratings for the CAH's can be stored with information on the CAH's outside of the metadata for the data items, but can be correlated to the data items by way of the CAH identifier present within the metadata of the data items. As discussed further below, the fan-rating for a given CAH can also be generated based on information other than the up-vote count tally and a down-vote count tally for data items contributed by the given CAH.

In the example of FIG. 2, the metadata for each data item also includes a geographic location for the CAH for the data item. In various embodiments, the geographic location can be specified by one or more of physical address, city, state, country, latitude/longitude coordinates, global positioning system (GPS) coordinates, internet protocol (IP) address, among other information that relates a geographic location for the CAH for the data item. And, in some embodiments, the metadata for each data item can include one or more group association(s) for the CAH for the data item. The group association can be specified as a group name or as a group number or as essentially any other type of information that identifies a particular group. The group association(s) for the CAH for the data item, as well as the other metadata for the data item, can be used to filter the population of data items within the community space 201 for a given account holder 107 who is streaming the media content item and who is simultaneously receiving content from within the community space 201. In some embodiments, the geographic location and group association(s) for the CAH's can be stored with information on the CAH's outside of the metadata for the data items, but can be correlated to the data items by way of the CAH identifier present within the metadata of the data items.

By way of example, consider a group association that is created for a group of friends (account holders 107) who wish to simultaneously stream a particular media content item at their respective locations. This group association can be used to filter the population of data items within the community space 201 associated with the particular media content item, such that only the data items contributed by the account holders 107 in the group of friends will be transferred to the account holders 107 in the group of friends for display in conjunction with the streaming and playback of the particular media content item. Therefore, in this example embodiment, filtering of community space 201 content by the group association created for the group of friends can be used to create a private communication space for the group of friends while they simultaneously stream and playback the particular media content item. Further with regard to filtering of the community space 201 content, it should be understood that any metadata parameter (index time, date/time added, CAH, type, content, up-vote count, down-vote count, fan-rating, CAH geographic location, CAH group association, etc.) or combination thereof can be used to filter the population of data items in the community space 201 to create a customized subset of community space 201 content for one or more account holders 107 as they stream and playback the media content item to which the community space 201 is associated.

With reference back to FIG. 1, it should be understood that when a CAH adds a data item to the community space 201, the CAH transmits digital data that defines the data item to the streaming service 109, and the streaming service 109 operates to store the digital data for the data item within a community data storage 115. In some embodiments, the community data storage 115 includes a number of data storage devices and/or data memory devices for storing data items in association with one or more community spaces for rapid acquisition by the streaming service 109. Also, it should be understood that the streaming service 109 can have access to other storage system for storing, maintaining, and accessing information related to the account holders 107 of the streaming service 109. In some embodiments, data items stored in the community data storage 115 can be correlated to their CAH by way of the CAH identifier, and information about the CAH for a given data item within the community data storage 115 can be accessed by the streaming service 109 from a storage system separate from the community data storage 115, so as to avoid storage of redundant data in both the community data storage 115 and in another storage system accessible by the streaming service 109.

It should be understood that the community space 201 for a given media content item can serve to virtualize a type of real-world "watercooler" conversation among account holders as they stream and play back the given media content item at their respective locations. Also, it should be understood that the community space 201 for a given media content item functions as both an archive and a dynamic communication space for supplemental content associated with the given media content item, where the supplemental content is in the form of data items within the community space 201. In other words, an archived population of data items contributed to the community space 201 for a given media content item is continuously updated as account holders 107 contribute new data items in conjunction with their streaming and playback of the given media content item, regardless of when the given media content item is streamed by the various account holders 107. And, at the actual time when the given media content item is being streamed and played back by an account holder 107, data items that are added to the community space 201 in real-time are made immediately available for transfer to the account holder 107 in accordance with their currently set preferences for receiving content from the community space 201. Therefore, regardless of when the given media content item is being streamed and played back by an account holder 107, the content (i.e., population of data items) of the community space 201 associated with the given media content item includes data items previously added to the community space 201 during previous streaming of the given media content item to various account holders 107 and data items currently added in real-time to the community space 201. In some embodiments, data items added to the community space 201 can remain indefinitely within the community space 201. Additionally, in some embodiments, data items added to the community space 201 can optionally have a limited term of existence within the community space 201, with an expiration of the limited term of existence triggered by a viewing of the data item by one or more specified users and/or defined by a specified time period or date/time.

Again, it should be appreciated that filtering of content in the community space 201 can be used to customize the experience for an account holder 107 with regard to time-dependency of data items that are transferred to the account holder 107 in conjunction with their current streaming and playback of the given media content item. For example, if an account holder wishes to only receive data items that are added to the community space 201 during the current streaming of the given media content item, the account holder can specify a filter setting to only have data items transferred from the community space 201 that have a date/time added value in their metadata that is later than the start date/time of the current streaming of the media content item. It should be appreciated that this type filtering can create a customized experience for a group of account holders 107 to simulate an initial airing of a previously aired media content item, which may be useful in preventing premature disclosure of information related to the media content item from the community space 201.

For example, consider a group of friends that wish to stream and playback a previously aired sporting event at the same time as if they were watching the sporting event live, and limit the content from the community space 201 to only content added by members of the group of friends during the current streaming of the sporting event. In this example, an association for the group of friends can be created with the streaming service 109, and each data item added to the community space 201 by a member of the group of friends can have the association for the group of friends specified in the metadata for the added data item. Then, each account holder 107 in the group of friends can specify that they wish to filter the content of the community space 201 by 1) the association for the group of friends as specified in the metadata of the data items, and 2) any date/time added value as specified in the metadata of the data items that is later than a start date/time of the current streaming of the sporting event by the group of friends. It should be appreciated that in this example the information transmitted from the community space 201 associated with the given media content item to each member of the group of friends will be limited to those data items added to the community space 201 by the members of the group of friends during the current streaming of the given media content item, so as to simulate a community space 201 experience for an initial and private group airing of the given media content item. However, it should also be appreciated that the population of data items within the community space 201 associated with the given media content item will remain universal and archival (in accordance with any limited term of existence respectively specified for various data items) even during the current streaming of the given media content item to the group of friends. Therefore, even during the current streaming of the given media content item by the group of friends, the overall content of the community space 201 for the given media content item can continue to be expanded by CAH's outside of the group of friends.

The community space 201 associated with a given media content item, as provided by the streaming service 109, provides gated access to an interactive environment in which authorized account holders 107 of the streaming service 109 can interact with each other and/or with third parties to enhance the entertainment/informational experience of the account holders as they use the streaming service 109 to stream and playback the given media content item. Also, the community space 201 can provide a messaging environment through which account holders 107 and/or third party entities can communicate. And, the community space 201 can provide a mechanism through which supplemental information can be provided/contributed by account holders 107 and/or third party entities, where the supplemental information can have essentially any type of audio/visual form. And, it should be understood that the streaming service 109 can be configured to police the content of the community space 201 to prevent inclusion of data items deemed offensive and/or not related to the given media content item to which the community space 201 is associated. In some embodiments, the streaming service 109 can be configured to set a restriction rating for each data item within the metadata of the data item, based on analysis of the data item by the streaming service 109. For example, in some embodiments, the restriction rating for a given data item may be set as general audience (G), parental guidance (PG), restricted (R), or explicit (X), among others. And, the account holder 107 can set their preference to filter content from the community space 201 by one or more of the restriction ratings as specified for the data items. Moreover, in some embodiments, the streaming service 109 can be configured to perform the analysis of the data items to determine their restriction ratings in an automated manner upon receiving the data items from the CAH's. This analysis can be rules-based and can include lexigraphical, grammatical, and/or phonemical analysis of the content of the data items.

As previously mentioned, the CAH for a data item within the community space 201 can have a fan-rating generated by the streaming service 109. In various embodiments, the fan-rating can be based on different characteristics and/or behaviors of the CAH and/or can be based on responses of other account holders 107 to data items added to the community space 201 by the CAH. For example, in some embodiments, the fan-rating for a CAH can be based on a percent of related media content items that have been streamed by the CAH. For instance, if the community space 201 is associated with a television show that is one of a series of television shows, the fan-rating for a CAH adding data items to the community space 201 associated with the television show can be based (at least in part) on the percent of the series of television shows that have been streamed (and presumably watched) by the CAH. In some embodiments, the fan-rating for a CAH can be based on a number of media content items streamed by the CAH. In some embodiments, the fan-rating for a CAH can be based a number of data items contributed to a given community space 201 by the CAH. In some embodiments, the fan-rating for a CAH can be based a number of data items contributed to any community space 201 by the CAH.

In some embodiments, the fan-rating for a CAH can be based on streaming habits of the CAH. And, in some embodiments, the fan-rating for a CAH can be based on participation of the CAH in activities provided through the community space 201. For example, in some embodiments, the streaming service 109 can add data items to a given community space 201, where some of these data items can include interactive opportunities for account holders 107, such as quizzes, surveys, questions, mini-games, etc. Participation/interaction with these data items by an account holder 107 can be tracked by the streaming service 109 and can be used to adjust the fan-rating of the account holder 107. In some embodiments, the voting activity of an account holder 107 with regard up/down voting of data items can be tracked by the streaming service 109 and can be used to adjust the fan-rating of the account holder 107.

Also, in some embodiments, the fan-rating for a CAH can be based on "light-touch" interaction by the CAH during initial streaming of media content items by the CAH. For example, the streaming service 109 can be configured to transmit special data items to an account holder 107, through the community space 201 associated with a given media content item, during an initial streaming by the account holder 107 of the given media content item, where the special data items request the account holder 107 to push a button or take some other action in association with the playback of the media content item, such as when the account holder 107 sees a particular object or hears a particular sound/word/phrase during the playback of the media content item. The account holder's 107 participation/response to these special data items can be tracked by the streaming service 109 and can be used to adjust the fan-rating of the account holder 107. In some embodiments, the special data items can be generated and transmitted by the streaming service 109 in partnership with a third party. For example, if an advertiser has product placement in a given media content item, the streaming service 109 can partner with the advertiser to generate and transmit a special data item through the community space 201 associated with the given media content item to request the account holder 107 to take a particular detectable action upon seeing or hearing something related to the advertiser's product placement within the media content item. In some embodiments, the account holder's 107 participation with this type of special data item can be used to earn real-world rewards. For example, if an account holder 107 successfully interacts with a special data item provided through the community space 201 to indicate observation by the account holder 107 of an advertiser's product within a given media content item during playback of the given media content item, the account holder 107 can win/earn a discount for the advertiser's product, where such discount can be conveyed to the account holder 107 by barcode, QR-code, or any other unique identifying mechanism in an email, text message, or other form of communication, or can be conveyed to the account holder in a secure manner through a website associated with the streaming service 109, or can be conveyed to the account holder 107 by non-digital means, such as by a physical coupon.

Generally speaking, it should be understood that the streaming service 109 can be configured to add special data items to any community space 201, wherein the special data items can be defined to promote account holder 107 interaction with the community space 201 and/or cross-promote other services and platforms in partnership with the streaming service 109. For example, in some embodiments, the streaming service 109 can have a company/enterprise relationship with another entity and can generate and add data items to a community space 201 associated with a given media content item to cross-promote a product and/or service offered by the other entity. For example, consider a case where the streaming service 109 is the PlayStation™ Vue service, and the media content item of interest is a movie based on a video game. In this example, the streaming service 109 (PlayStation™ Vue) can be configured to generate and add special data items to the community space 201 associated with the movie based on the video game, where the special data items offer or lead to a discount on the video game for the PlayStation™ gaming system, or offer or lead to in-game rewards provided through the PlayStation™ gaming system. It should be appreciated that this is one of many examples of how data items within the community space 201 can be used for cross-promotion of products and services.

For example, with the streaming service 109 being the PlayStation™ Vue service, data items can be generated and added to the community space 201 to cross-promote PlayStation™ Plus time, PlayStation™ Now time, discounts on PlayStation™ Store merchandise, etc. Additionally, in some embodiments, the streaming service 109 can generate and add special data items to the community space 201 that allow account holders to unlock special/hidden features for the associated media content item. For example, a special data item can be added by the streaming service 109 to the community space 201 to overlay bonus audio/video during playback of media content item. By way of example, consider that the media content item is a football game, and the streaming service 109 generates and adds a special data item to the community space 201 associated with the football game, where the special data item provides a link (or other user-activatable mechanism) that upon activation by the account holder 107 streams video for additional camera views to the account holder 107 for display in conjunction with media content item. For instance, if a major play occurs in the football game, the streaming service 109 (or partner working with the streaming service 109) can generate and add a special data item to the community space 201 associated with the football game that provides a link that upon activation by the account holder 107 causes streaming to the account holder 107 of extra video for camera views of the two team's sidelines during the major play that can be displayed for the account holder 107 in conjunction with the playback of the football game.

With reference back to FIG. 1, in some embodiments, the video streaming system 101 includes a dynamic data item generation module 117 configured to process the data items within the community space 201 associated with a given media content item to dynamically generate and add new data items to the community space 201 based on the content of the data items added to the community space by the CAH's. The dynamic data item generation module 117 includes a machine learning module 119 configured to analyze and correlate the content of the data items added to the community space by the CAH's to determine subject matter and content for generation of dynamic data items. In some embodiments, the machine learning module 119 extracts lexigraphical, grammatical, and/or phonemical content from the data items within the community space 201 to identify similarities and differences among various data items. In some embodiments, the machine learning module 119 is configured to identify common themes and/or threads of subject matter among subsets of data items, and upon doing so generate a new data item that encapsulates/summarizes the identified common themes and/or threads of subject matter. For example, if a number of data items convey a common sentiment, the machine learning module 119 can identify the common sentiment and dynamically generate a new data item that summarizes the common sentiment. Then, depending on the preference settings of the account holder 107, the dynamically generated data item can be transmitted to the account holder 107 in lieu of the number of data items that convey the common sentiment. This can help declutter the community space 201 content received by the account holder 107. Also, the dynamically generated data item can include an activatable link that upon activation by the account holder 107 causes transmission and display of the data items upon which the dynamically generated data item is based.

Also, in some embodiments, the machine learning module 119 can be configured to correlate identified themes and/or threads of subject matter among subsets of data items with regard to multiple features and/or relationships in order to dynamically generate new data items that represent content not yet included within the community space 201. For example, the machine learning module 119 can be configured to determine that a first subset of data items have a first common theme, and a second subset of data items have a second common theme, and that an identifiable relationship exists between the first subset of data items and the second subset of data items. Then, based on this, the machine learning module 119 can be configured to generate a new data item that represents a linkage of the first common theme with the second common theme by way of the identified relationship.

For example, consider the case of a media content item that is a football game, with the community space 201 including data items contributed by fans of each team playing in the football game. The machine learning module 119 can operate to determine that a first subset of data items have a first common theme in that they are contributed by fans of the first team. The machine learning module 119 can operate to determine that a second subset of data items have a second common theme in that they are contributed by fans of the second team. Then, the machine learning module 119 can operate to determine that an identifiable relationship exists between the first subset of data items and the second subset of data items in that the fans of the first team like a particular beverage and the fans of the second team also like the particular beverage. Then, the machine learning module 119 can operate to dynamically generate a new data item that provides information about the particular beverage and add the new data item to the community space 201. It should be understood that the above example is provided for purposes of description and is not intended to be limiting with regard to the functionality of the dynamic data item generation module 117 and/or with regard to the machine learning module 119. It should be understood that the dynamic data item generation module 117 and the machine learning module 119 can be configured to process and analyze the data items within the community space 201 in many different ways to generate dynamic data items of all types.

Figure 3:
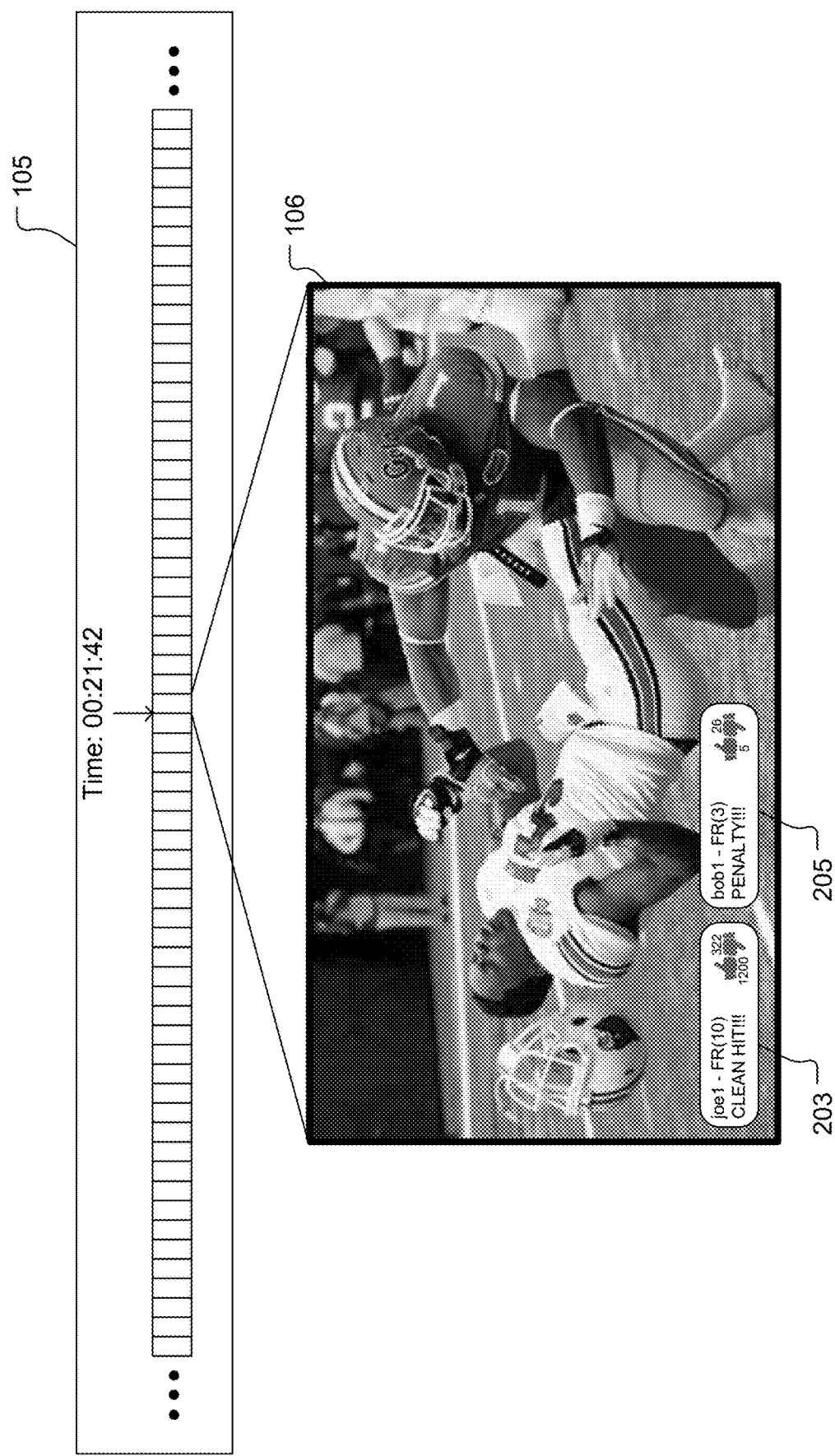
FIG. 3 shows how data items transmitted from the community space can be overlaid directly on the given media content item during playback of the media content items, in accordance with some embodiments of the present invention.
Figure 4:
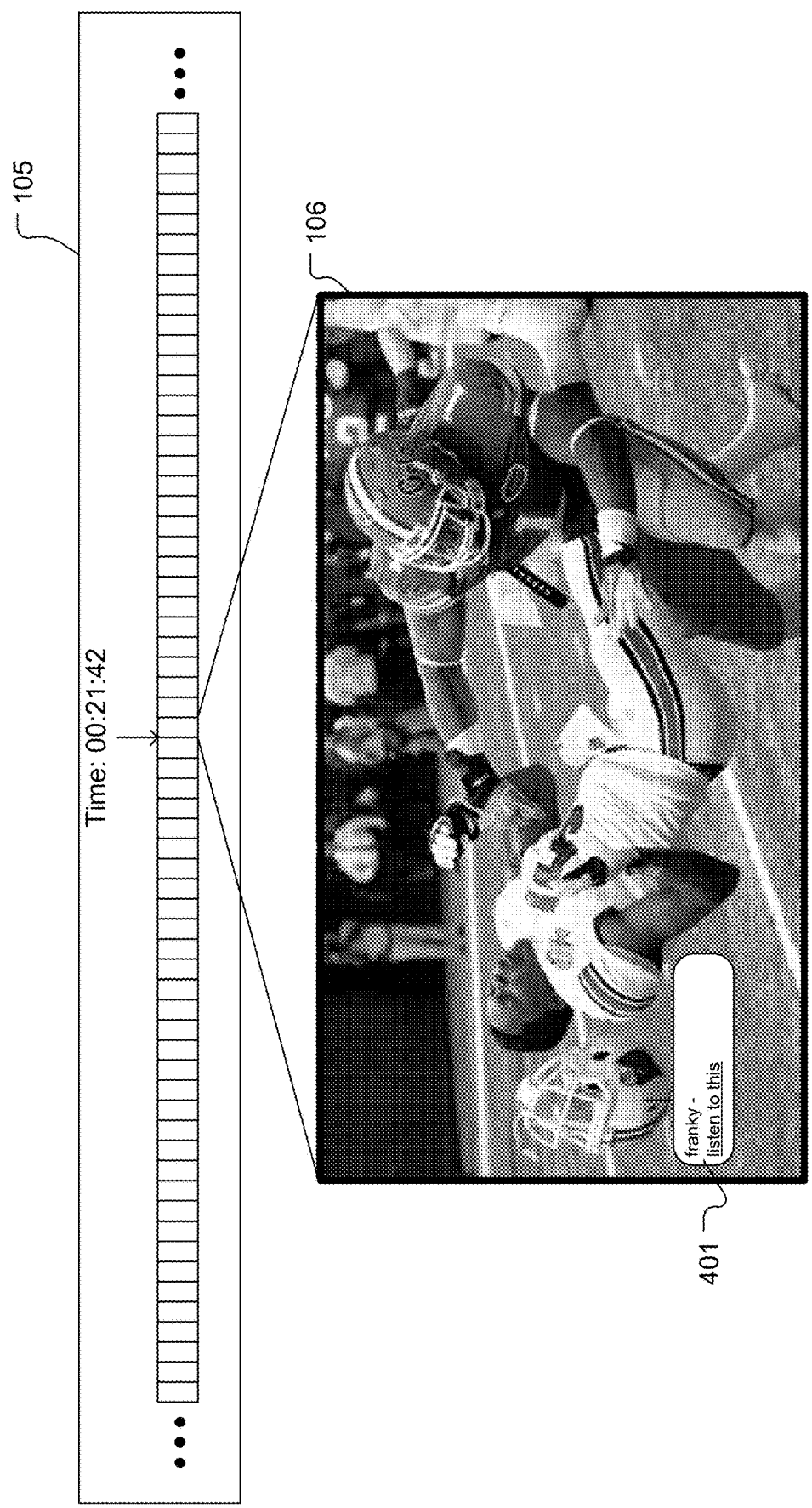
FIG. 4 shows the example of FIG. 3 with a data item tagged to the flying helmet, in accordance with some embodiments of the present invention.

In various embodiments, data items that are transmitted from the community space 201 associated with a given media content item in conjunction with streaming of the given media content item can be organized and displayed in different ways upon receipt at the electronic device 105 of the account holder 107. FIG. 3 shows how data items transmitted from the community space 201 can be overlaid directly on the given media content item during playback of the media content items, in accordance with some embodiments of the present invention. In the example of FIG. 3, the data items 203 and 205 from FIG. 2 are overlaid on the media content item in accordance with their index time of 00:21:42. Specifically, in the example of FIG. 3, the data items 203 and 205 appear on the display 106 over portions of the media content item when the playback of the media content item reaches time 00:21:42. In some embodiments, the streaming service 109 can direct a length of time the data items 203 and 205 are displayed. For example, the streaming service 109 may direct that the data items 203 and 205 are displayed for 5 seconds beginning at time 00:21:42. In some embodiments, the account holder 107 that requests streaming of the media content item can specify a preference for the amount of time data items are to be displayed during playback of the media content item. Also, in some embodiments, the account holder 107 can provide an input signal to cause particular data items to either be removed from the display 106 or persist on the display 106. Also, in some embodiments, the location at which data items appear on the display 106 can be controlled by the streaming service 109. And, in some embodiments, the location at which data items appear on the display 106 can be specified to the streaming service 109 as a preference, e.g., bottom, top, left, right, etc. Additionally, in some embodiments, some data items can be assigned/tagged to specific pixel locations within the display 106. For example, FIG. 4 shows the example of FIG. 3 with a data item 401 tagged to the flying helmet, in accordance with some embodiments of the present invention. Therefore, in this example, the data item 401 is displayed at a pixel location corresponding to the flying helmet. In this example, the data item 401 is of audio type with a link "listen to this" that upon activation plays some audio from a stored audio content file, such as close up sound of the collision with the helmet. Also, in some embodiments, the location of a tag for a data item within an image can include a two-dimensional location within a video frame. And, in some embodiments, the location of a tag for a data item within an image can include a three-plus-dimensional location, such that the location of the tag is specified by a combination of x-location, y-location, depth-location, occlusion rules, among other parameters, which may be relevant in the context of virtual reality and/or augmented reality viewing applications. Additionally, in some embodiments, through use of image recognition processes, a data item tagged to an object within a scene at some initial point can be made to remain attached to that object as the scene progresses in time, even as the object is moved around within the scene.

Additionally, during playback of the media content item, the account holder 107 can provide an input signal to the streaming service 109 to toggle on/off the display of data items from the community space 201. And, as previously discussed, the streaming service 109 can provide filtering options to the account holder 107 to allow the account holder 107 to select how data items within the community space 201 should be filtered for transmission to the account holder 107. Again, in various embodiments, the population of data items within the community space 201 can be filtered by essentially any parameter(s) that characterize the data items and/or the source of the data items. Also, in some embodiments, the account holder 107 can specify how the data items are to be displayed, such as what information about the data items is to be displayed. In the example of FIG. 3, the data items 203 and 205 are displayed to show the public name of the CAH, the fan-rating of the CAH, the content of the data items, the up-vote count, and the down-vote count. In the example of FIG. 4, the data item 401 is displayed to show just the public name of the CAH and the content of the data item.

Figure 5:
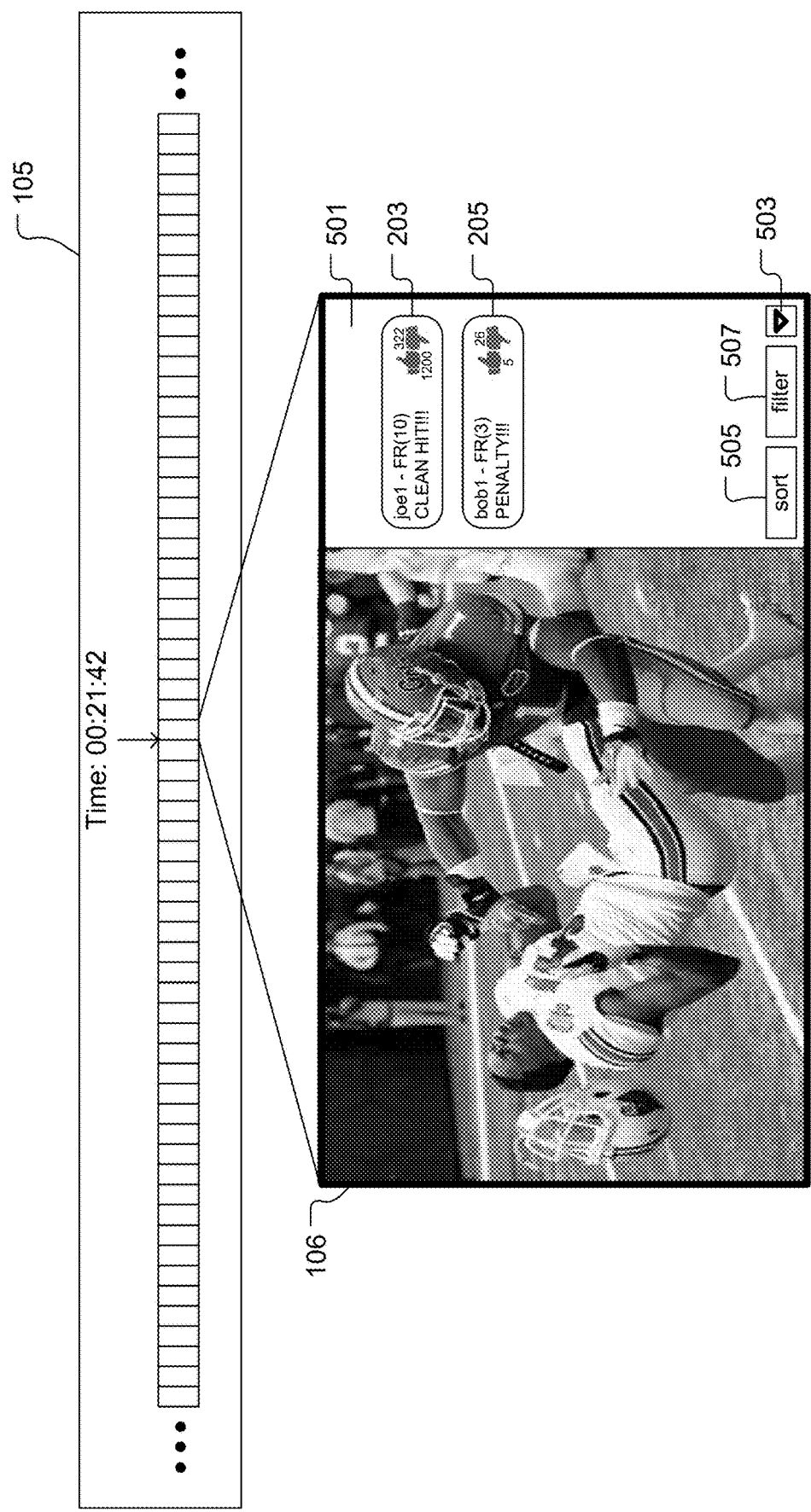
FIG. 5 shows display of a container in conjunction with the media content item, with the data items from the community space displayed within the container, in accordance with some embodiments of the present invention.
Figure 6:
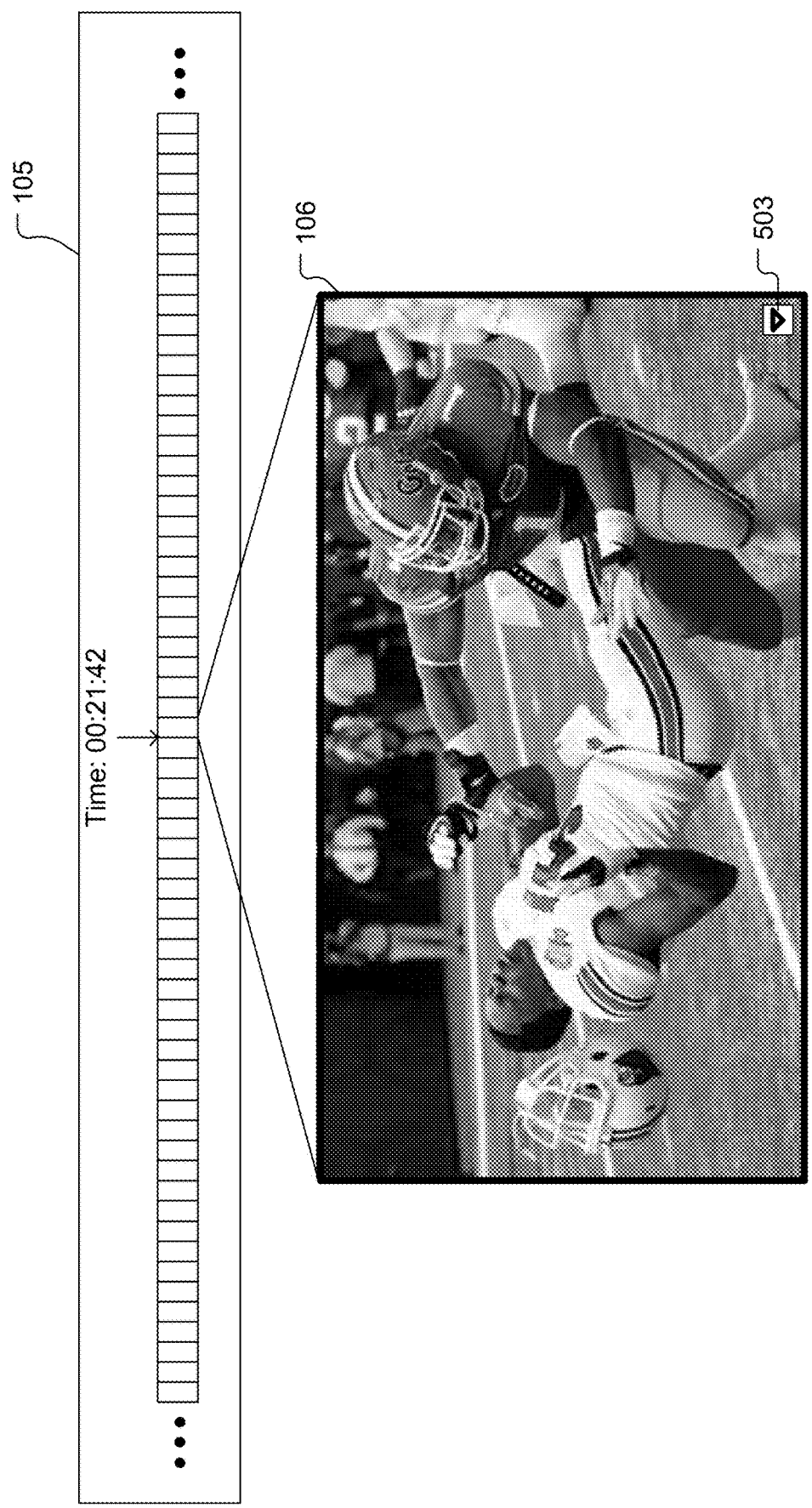
FIG. 6 shows the display of FIG. 5 with the container toggled to the closed state and with the control provided for toggling the container to the open state, in accordance with some embodiments of the present invention.

In some cases, the account holder 107 may not wish to have the data items displayed over the media content item, for example to avoid obscuring or distracting from the media content. FIG. 5 shows display of a container 501 in conjunction with the media content item, with the data items from the community space 201 displayed within the container 501, in accordance with some embodiments of the present invention. In some embodiments, the data items shown in the container 501 follow the playback time of the media content item. In other words, the data items shown in the container 501 at a given time are the data items from the community space 201 that have an index time at or near the current playback time of the media content item. The container 501 can include a control 503 to enable toggling between open and closed states of the container 501. For example, FIG. 6 shows the display of FIG. 5 with the container 501 toggled to the closed state and with the control 503 provided for toggling the container 501 to the open state, in accordance with some embodiments of the present invention. In some embodiments, the account holder 107 can move and/or resize the container 501 on the display using a controller and/or other device that conveys pertinent input signals. And, in some embodiments, contents of the container 501 are automatically resized and repositioned as the account holder 107 moves and/or resizes the container 501.

Figure 7:
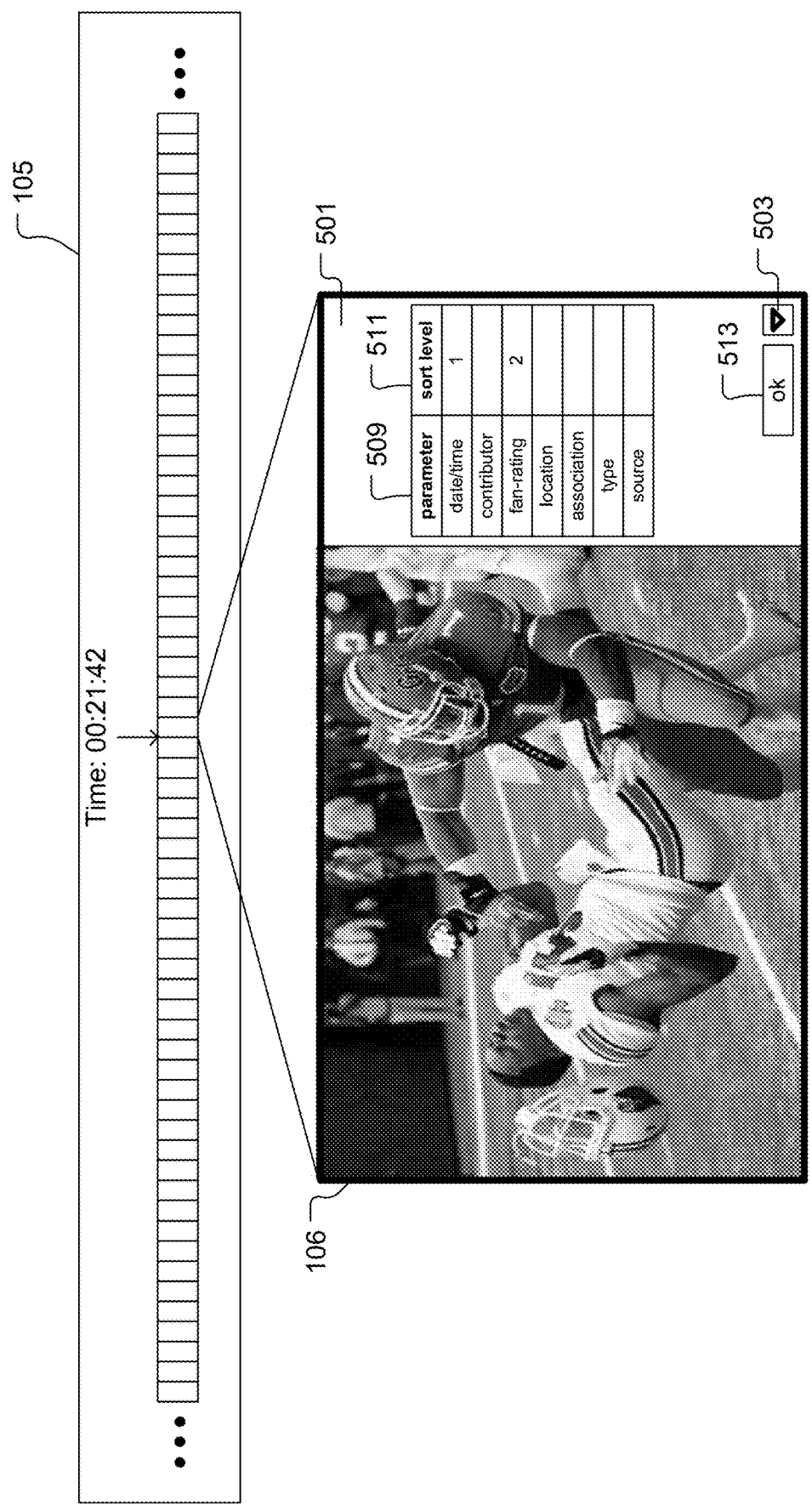
FIG. 7 shows the container upon selection of the sort control, in accordance with some embodiments of the present invention.

FIG. 5 also shows a sort control 505 configured to allow the account holder to specify how the data items shown within the container 501 should be sorted. FIG. 7 shows the container 501 upon selection of the sort control 505, in accordance with some embodiments of the present invention. Upon selection of the sort control 505, the container 501 adjusts to show a list of parameters 509 by which the data items can be sorted, and a corresponding sort level fields 511 in which the desired sort levels can be entered by the account holder 107. The sort levels specify an order of parameters by which the data items are sorted. In the example of FIG. 7, the data items will be sorted first by date and time when the data items were added to the community space 201 and then by the fan-rating of the CAH that added the data items to the community space 201. The list of parameters 509 is provided by way of example. In other embodiments, the list of parameters 509 can include other parameters that characterize the data items and/or the CAH's that contributed the data items. In the example list of parameters 509 the contributor parameter refers to the identity of the CAH that contributed the data item to the community space 201, the location parameter refers to the geographic location of the CAH that contributed the data item to the community space 201, the association parameter refers to any group association(s) of the CAH that contributed the data item to the community space 201, the type parameter refers to the type of data item (e.g., text, audio, image, graphic, music, video, picture, etc.), and the source parameter refers to the source of the data item (e.g., an account holder, a third party, an advertiser, the streaming service 109, etc.). The container 501 also provides an acceptance control 513 that upon activation will revert the container to showing the data items in accordance with the sort specifications.

Figure 8:
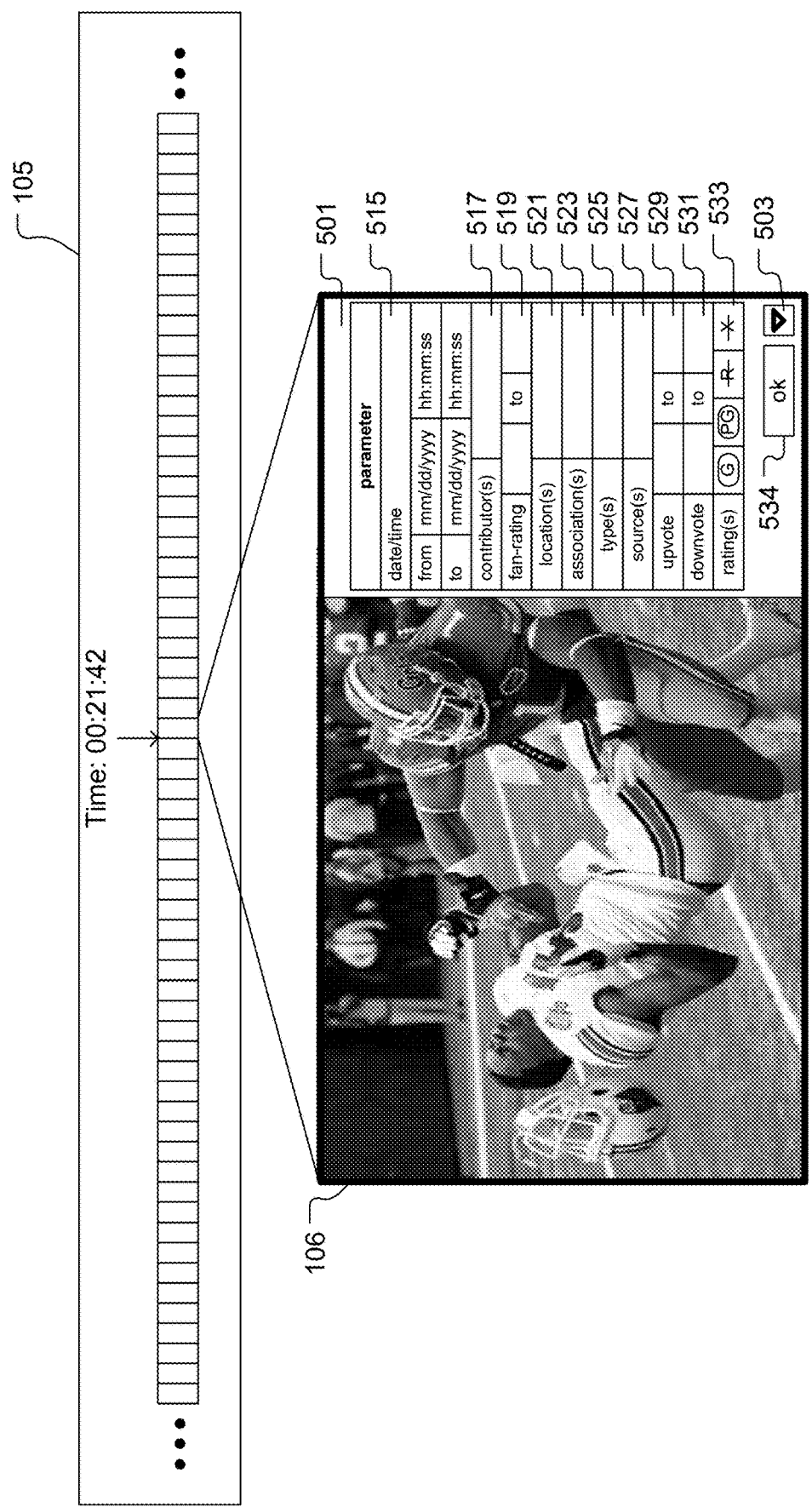
FIG. 8 shows the container upon selection of the filter control, in accordance with some embodiments of the present invention.

With reference back to FIG. 5, the container 501 can also include a filter control 507 configured to allow the account holder 107 to specify how the population of data items within the community space 201 should be filtered for transmission to the account holder 107. FIG. 8 shows the container 501 upon selection of the filter control 507, in accordance with some embodiments of the present invention. It should be understood that the population of data items within the community space 201 can be filtered by essentially any parameter that characterizes the data items and/or the CAH that contributed the data items. The example of FIG. 8 shows a date/time filter parameter 515 that allows the account holder 107 to specify a range of dates and times at which data items were added to the community space 201. When set, only the data items that were added to the community space 201 during the specified range of dates and time will be transmitted for display within the container 501. The date and time filter ranges can be single-ended by leaving one end of the range unspecified. The example of FIG. 8 also shows a contributor(s) filter parameter 517 that allows the account holder 107 to specify one or more data item contributors, i.e., CAH(s). When set, only the data items that were added to the community space 201 by the specified contributor(s) will be transmitted for display within the container 501.

The example of FIG. 8 also shows a fan-rating filter parameter 519 that allows the account holder 107 to specify fan-rating range for data item contributors. When set, only the data items that were added to the community space 201 by the contributor(s) having a fan-rating within the specified range will be transmitted for display within the container 501. The fan-rating range can be single-ended by leaving one end of the range unspecified. The example of FIG. 8 also shows a location filter parameter 521 that allows the account holder 107 to specify geographic location for data item contributors. When set, only the data items that were added to the community space 201 by the contributor(s) having the specified geographic location will be transmitted for display within the container 501. In various embodiments, the geographic location can be specified as a physical address, a city, a county, a state, a country, among others. The example of FIG. 8 also shows an association(s) filter parameter 523 that allows the account holder 107 to specify one or more group association(s) for data item contributors. When set, only the data items that were added to the community space 201 by the contributor(s) having the specified group association(s) will be transmitted for display within the container 501.

The example of FIG. 8 also shows a type(s) filter parameter 525 that allows the account holder 107 to specify one or more data item types. When set, only the data items that are of at least one of the specified data item types will be transmitted for display within the container 501. In various embodiments, the data item types include text, audio, image, graphic, music, video, picture, among others. The example of FIG. 8 also shows a source(s) filter parameter 527 that allows the account holder 107 to specify one or more data item sources. When set, only the data items that originate from at least one of the specified data item sources will be transmitted for display within the container 501. In various embodiments, the data item sources can include an account holder, a third party, an advertiser, the streaming service 109, among others.

The example of FIG. 8 also shows an up-vote filter parameter 529 that allows the account holder 107 to specify an up-vote range for data items. When set, only the data items that have an up-vote count within the specified range will be transmitted for display within the container 501. The up-vote range can be single-ended by leaving one end of the range unspecified. Similarly, the example of FIG. 8 also shows an down-vote filter parameter 531 that allows the account holder 107 to specify a down-vote range for data items. When set, only the data items that have a down-vote count within the specified range will be transmitted for display within the container 501. The down-vote range can be single-ended by leaving one end of the range unspecified.

The example of FIG. 8 also shows a rating(s) filter parameter 533 that allows the account holder 107 to specify one or more allowed ratings for the data item types. When set, only the data items that are of at least one of the specified data item ratings will be transmitted for display within the container 501. In various embodiments, the data item ratings include general audience (G), parental guidance (PG), restricted (R), explicit (X), among others. The container 501 also provides an acceptance control 534 that upon activation will revert the container 501 to showing the data items in accordance with the filter specifications. It should be understood that the sort specifications and the filter specifications can be simultaneously applied to the population of data items within the community space 201 for determining which data items are to be transmitted to a given account holder 107, without regard to how the data items are displayed to the account holder 107 (e.g., overlaid on media content item or within a container 501).

Figure 9:
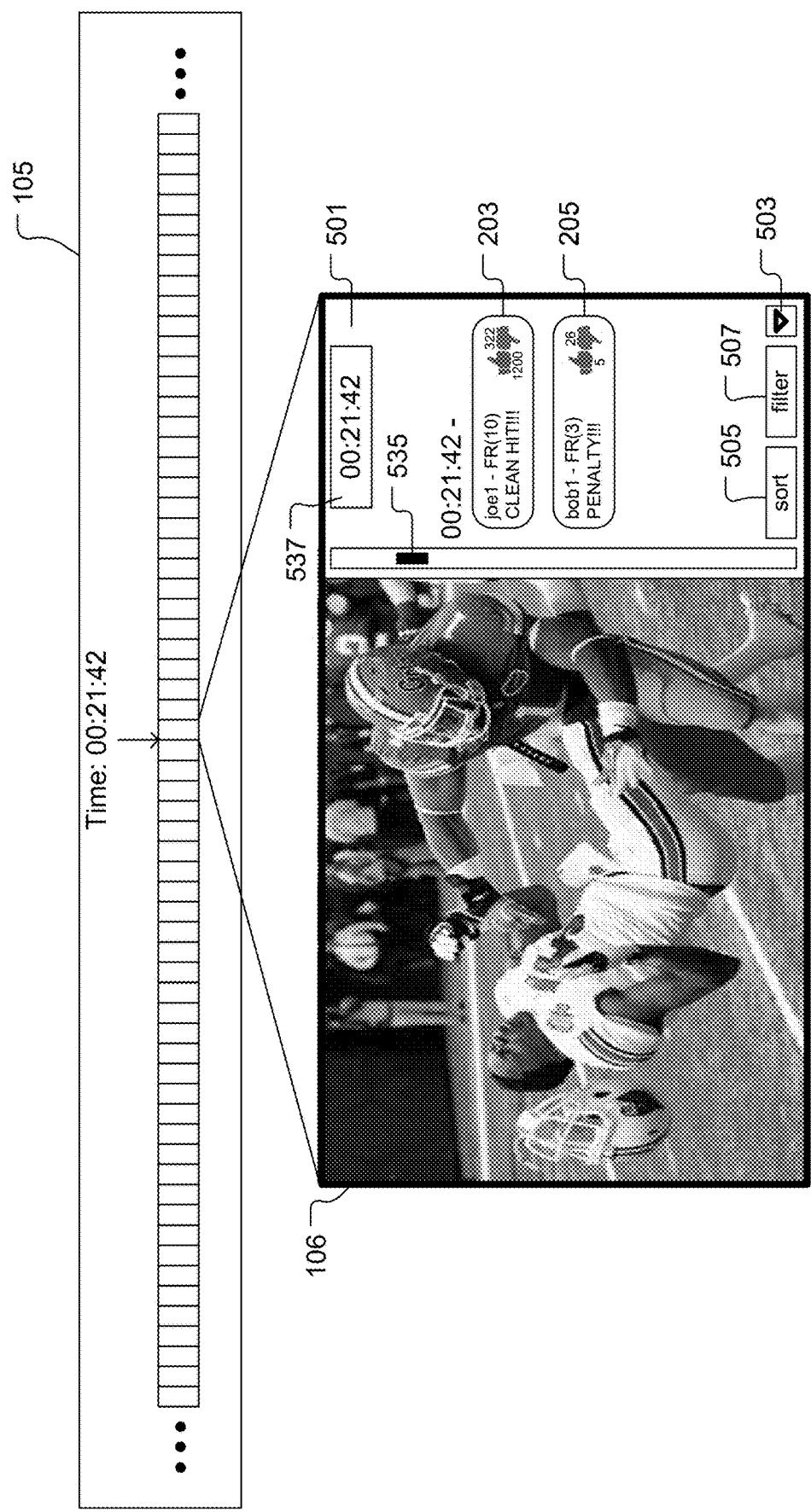
FIG. 9 shows the container of FIG. 5 with inclusion of a navigation control for navigating temporally through the data items within the container, in accordance with some embodiments of the present invention.

FIG. 9 shows the container 501 of FIG. 5 with inclusion of a navigation control 535 for navigating temporally through the data items within the container 501, in accordance with some embodiments of the present invention. In the example of FIG. 9, the navigation control 535 can be moved like a slider to scroll through the data items within the container 501. This features allows the user (account holder 107) to look backward and forward through the data items relative to the current playback time of the media content item. Also, in some embodiments, the data items shown in the container 501 are configured to provide temporal control of the playback of the media content item upon their selection by the user. For example, the user can navigate forward in time, relative to the current playback time of the media content item, through the data items in the container 501 using the navigation control 535, and can select a data item that is forward in time. Upon selection of the data item that is forward in time, the playback time of the media content item will be moved to the index time of the selected data item. In this manner, the container and its data items contents can be used to control playback of the media content item. Also, in some embodiments, a time control field 537 can be provided in the container 501 to specify the current playback time of the media content item. And, in some embodiments, the user can directly adjust the time within the time control field 537 to cause a corresponding change in the current playback time of the media content item and to simultaneously change the data items shown in the container 501 to those having index times at or near the time specified within the time control field 537.

Figure 10:
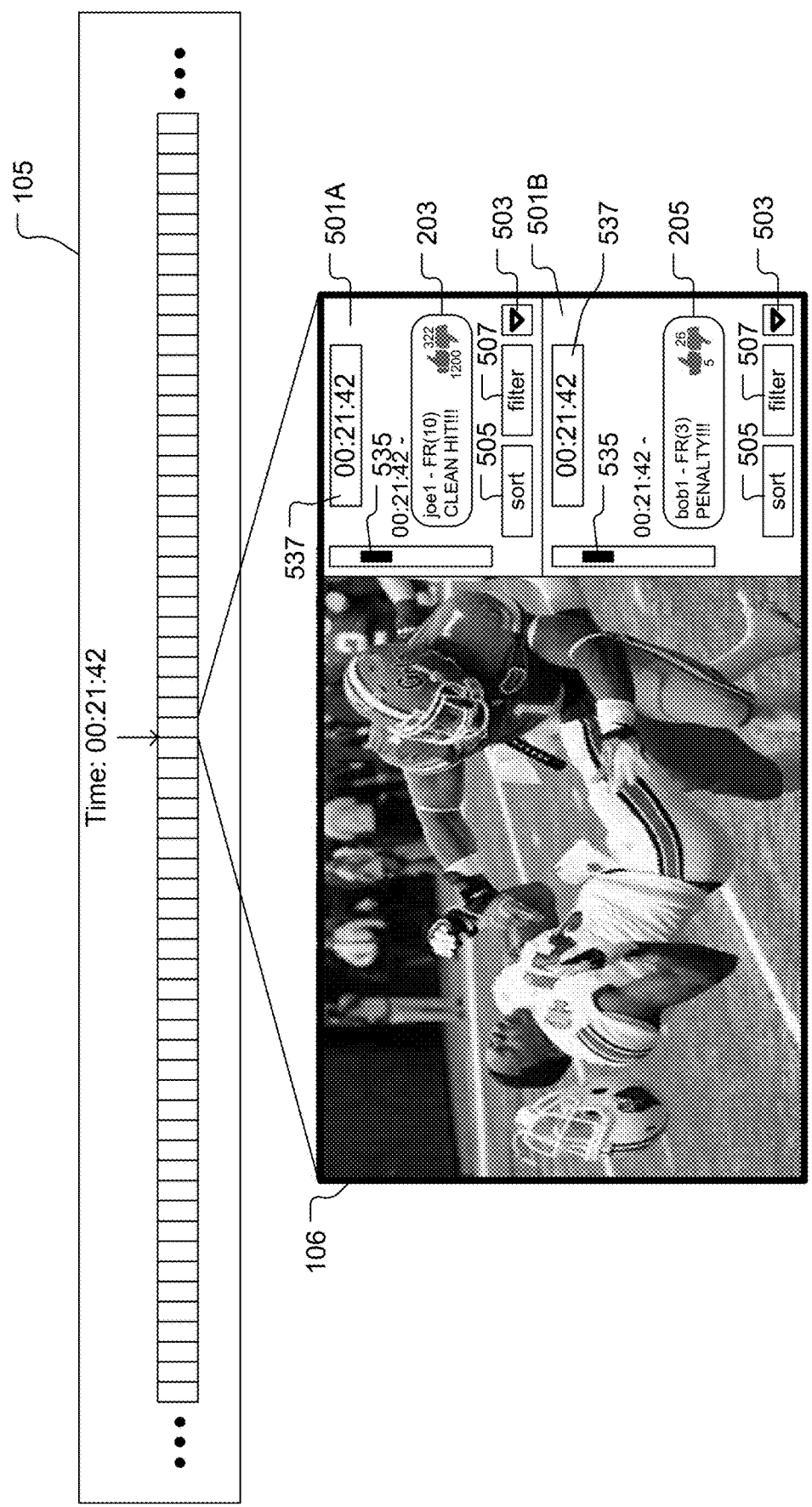
FIG. 10 shows display of multiple containers in conjunction with playback of the media content item, in accordance with some embodiments of the present invention.

In some embodiments, multiple containers 501 can be simultaneously displayed in conjunction with the playback of the media content item. FIG. 10 shows display of multiple containers 501A and 501B in conjunction with playback of the media content item, in accordance with some embodiments of the present invention. Each container 501A and 501B can have its own sort settings and its own filter settings. Therefore, it should be appreciated that the account holder 107 can set up multiple containers 501A, 501B to simultaneously display data items from the community space 201 in a compartmentalized manner. For instance, using the football game example, the user can set up the container 501A to show data items associated with fans of the first team and can set up the container 501B to show data items associated with fans of the second team. In other example, the user may set up one container to include only third party and/or advertiser sourced data items, and set up another container to include data items contributed from a selected group of friends. It should be appreciated that the compartmentalization of the population of data items from the community space 201 into different containers, e.g., 501A, 501B, by use of filter settings for the different containers can enhance the user's ability to consume more data items in a simultaneous manner and thereby enhance the user's experience.

Also, with reference back to FIG. 1, in some embodiments, the data items transmitted from the community space 201 in conjunction with streaming of the associated media content item can be transmitted for display on a device 108 of the account holder 107 that is different from the electronic device 105 and display 106 that the account holder 107 is using to view the media content item. For example, the account holder 107 can have an application executing on the device 108 that is in communication with the streaming service 109, where the device 108 is a personal electronic device (such as a smartphone or a tablet or laptop, or a personal computer, or any other type of personal electronic device with a display screen). In this example, the media content item is transmitted to the electronic device 105 for playback on the display 106 of the account holder 107, and the data items from the community space 201 associated with the media content item are transmitted in a simultaneous manner to the application executing on the device 108 of the account holder 107. The application executing on the device 108 of the account holder 107 can be configured to provide the container 501 features disclosed above. Also, the streaming service 109 can be configured to synchronize the playback of the media content item on the display 106 with the operation of the container 501 on the device 108. In some embodiments, the device 108 receives data directly from the streaming service 109 and communicates data directly to the streaming service 109, by way of an appropriate configuration of the network 103. In some embodiments, the device 108 receives data from the streaming service 109 by way of the electronic device 105, and/or communicates data to the streaming service 109 by way of the electronic device 105. In some embodiments, the device 108 and the electronic device 105 communicate with each other using a local network, such as a Wi-Fi network, a Bluetooth network, or another type of local wireless and/or wired network.

Figure 11:
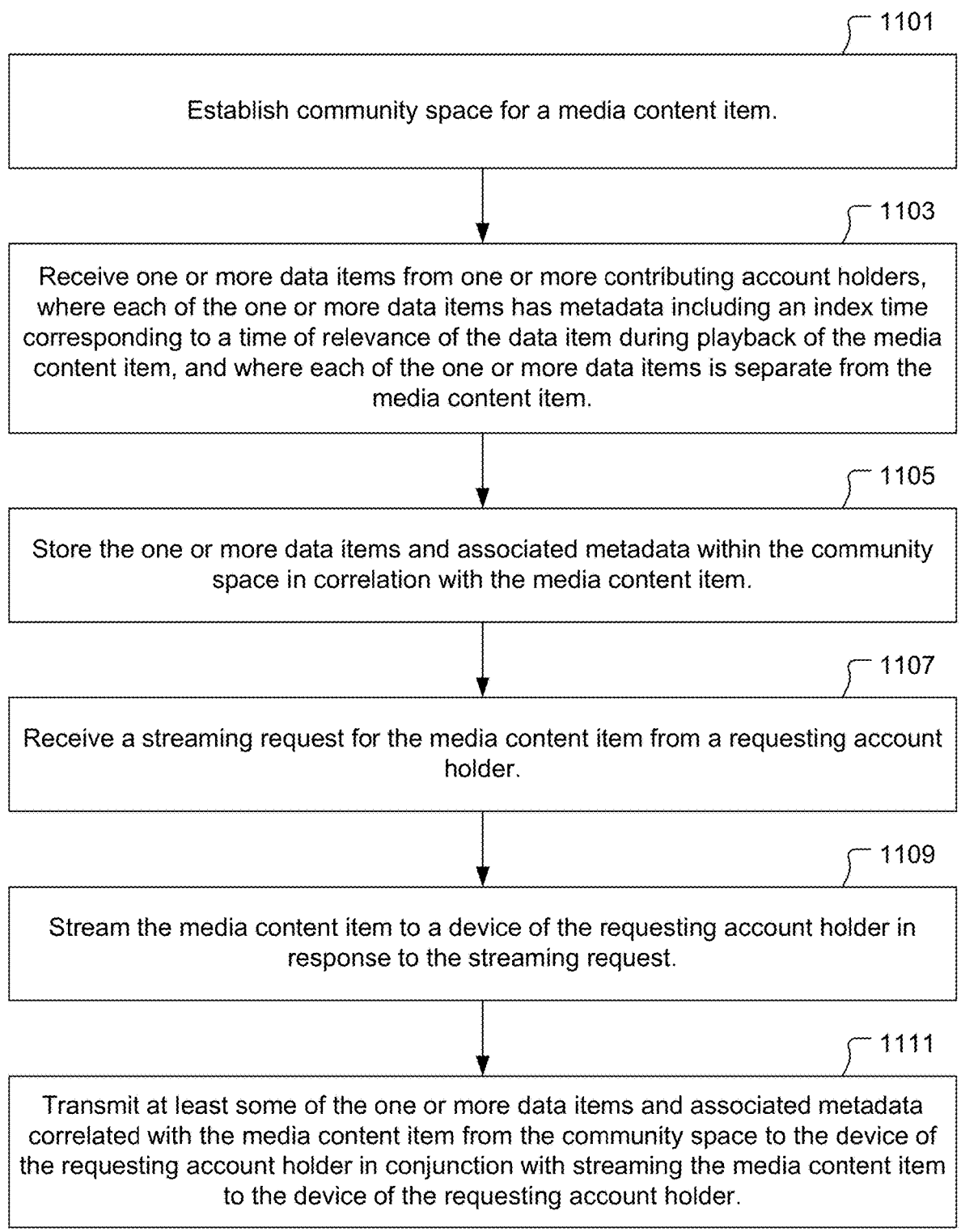
FIG. 11 shows a flowchart of a method for operating a streaming service, in accordance with some embodiments of the present invention.

FIG. 11 shows a flowchart of a method for operating a streaming service, e.g., streaming service 109, in accordance with some embodiments of the present invention. The method includes an operation 1101 for establishing a community space for a media content item. The community space also has a corresponding designated data storage space within a community data storage system. In some embodiments, the community space for the media content item is generated upon an initial streaming of the media content item. In some embodiments, the media content item is a streaming video. In some embodiments, the streaming video is one or more of a movie, a television show, a sportscast, an independent video, and a computer-generated video, among others. The method also includes an operation 1103 for receiving one or more data items from one or more contributing account holders. Each of the one or more data items has metadata including an index time corresponding to a time of relevance of the data item during playback of the media content item. Also, each of the one or more data items is separate from the media content item. In some embodiments, the data item includes digital data for one or more of a text message, an image, a graphic, a photograph, an audio recording, a video clip, and a music file, among others. The method also includes an operation 1105 for storing the one or more data items and associated metadata within the community space in correlation with the media content item.

The method also includes an operation 1107 for receiving a streaming request for the media content item from a requesting account holder. The method also includes an operation 1109 for streaming the media content item to a device of the requesting account holder in response to the streaming request. The method also includes an operation 1111 for transmitting at least some of the one or more data items and associated metadata correlated with the media content item from the community space to the device of the requesting account holder in conjunction with streaming the media content item to the device of the requesting account holder. The method can also include an operation for directing display of the one or more data items on the device of the requesting account holder in accordance with the index time of the data item during playback of the media content item. In some embodiments, the one or more data items are displayed on the device of the requesting account holder simultaneously with the playback of the media content item.

The method can also include receiving an additional data item from one or more contributing account holders during streaming of the media content item to the device of the requesting account holder. The additional data item can have metadata including an index time corresponding to a time of relevance of the additional data item during playback of the media content item. The method can also include an operation for storing the additional data item and associated metadata within the community space in correlation with the media content item. The method can also include transmitting the additional data item and associated metadata from the community space to the device of the requesting account holder in conjunction with continued streaming of the media content item to the device of the requesting account holder.

In some embodiments, the metadata of each data item includes an identity of the contributing account holder from whom the data item is received. Also, in some embodiments, the method can include an operation for tracking a fan-rating for the contributing account holder from whom the data item is received. The metadata of each data item can include the fan-rating for the contributing account holder from whom the data item is received. The method can also include an operation for directing display of the one or more data items on the device of the requesting account holder in accordance with the index time of the data item during playback of the media content item, where one or both of the identity of the contributing account holder from whom the data item is received and the fan-rating for the contributing account holder from whom the data item is received is displayed in conjunction with the data item on the device of the requesting account holder. In some embodiments, tracking the fan-rating for the contributing account holder from whom the data item is received includes one or more of tracking a number of streaming requests received from the contributing account holder, tracking a number of views of data items received from the contributing account holder, tracking participation of the contributing account holder in one or more activities associated with the community space, and tracking a vote count associated with data items received from the contributing account holder.

In some embodiments, the method includes an operation for directing display of a container including the one or more data items on the device of the requesting account holder. In some embodiments, the container is configured to provide for display navigation through the one or more data items. In some embodiments, the container is displayed on the device of the requesting account holder simultaneously with the playback of the media content item. In some embodiments, the container is configured to provide a user-controllable sort of the one or more data items by one or more of index time, contributing account holder, data item type, fan-rating, geographic location of contributing account holder, and group association of contributing account holder, among others. In some embodiments, the container is configured to provide a text search function to enable search of a specified text string within the content of the one or more data items. Also, in some embodiments, the container is configured to enable user-selection of any of the one or more data items. And, the method can further include an operation for moving a current playback time of the media content item to the index time within the metadata of a currently selected data item within the container.

In some embodiments, the metadata of some of the one or more data items includes specification of a pixel position within a video frame of the media content item, where the data item is correlated to the pixel position. In some embodiments, the method can include an operation for directing display of the one or more data items on the device of the requesting account holder in accordance with the index time of the data item during playback of the media content item and at the pixel position to which the data item is correlated.

In some embodiments, the method includes an operation for receiving a specification of one or more data item filter parameters from the requesting account holder. The method can also include an operation for filtering the one or more data items stored within the community space in accordance with the specification of one or more data item filter parameters to identify a set of filtered data items. Then, just the set of filtered data items and associated metadata correlated with the media content item is transmitted from the community space to the device of the requesting account holder in conjunction with streaming the media content item to the device of the requesting account holder. In some embodiments, the one or more data item filter parameters include one or more of index time, contributing account holder, data item type, fan-rating, geographic location of contributing account holder, group association of contributing account holder, and data item rating, among others.

In some embodiments, the method includes an operation for processing the one or more data items received from the one or more contributing account holders through a machine learning module to generate one or more dynamic data items based on the data items received from the one or more contributing account holders. Each of the one or more dynamic data items has metadata including an index time corresponding to a time of relevance of the dynamic data item during playback of the media content item. And, each of the one or more dynamic data items has metadata including a history of the one or more data items received from the one or more contributing account holders upon which the dynamic data item is based. The method can also include storing the one or more dynamic data items and associated metadata within the community space in correlation with the media content item. And, the method can include transmitting some of the one or more dynamic data items and associated metadata from the community space to the device of the requesting account holder in conjunction with streaming of the media content item to the device of the requesting account holder.

In some embodiments, the machine learning module is configured to correlate multiple data items received from the one or more contributing account holders into a set of correlated data items based on inclusion of similar content within the set of correlated data items. The machine learning module can also be configured to determine a subject and/or a theme of the set of correlated data items. The machine learning module can also be configured to generate a dynamic data item conveying the determined subject and/or theme of the set of correlated data items. In some embodiments, some of the one or more dynamic data items represent a consolidation of a plurality of data items received from the one or more contributing account holders. In some embodiments, some of the one or more dynamic data items represent a new composition based on a plurality of data items received from the one or more contributing account holders.

Although some method operations have been described in a specific order herein, it should be understood that other housekeeping operations may be performed between operations, or operations may be adjusted so that they occur at slightly different times, or may be distributed in a system which allows the occurrence of the processing operations at various intervals associated with the processing. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various components utilized with the invention can be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A method, comprising:
 establishing a community space for a video;
 receiving a plurality of data items associated to the video from at least one contributing account holder, the plurality of data items being separate from the video, each of the plurality of data items including metadata specifying a time of relevance of the data item within the video, and an identity of the contributing account holder of the data item, wherein the metadata of a given data item of the plurality of data items includes specification of a pixel position within a video frame of the video, wherein the given data item is correlated to the pixel position;

storing the plurality of data items and metadata within the community space in correlation with the video;

operating a machine learning module to correlate multiple data items of the plurality of data items into a set of correlated data items;

operating the machine learning module to determine a subject or a theme of the set of correlated data items;

generating a dynamic data item and associated metadata that conveys the determined subject or theme of the set of correlated data items;

storing the dynamic data item and associated metadata within the community space in correlation with the video;

receiving a streaming request for the video from a requesting account holder;

streaming the video to a computing device of the requesting account holder in response to the streaming request; and transmitting the dynamic data item and associated metadata from the community space to the computing device of the requesting account holder in conjunction with streaming the video.

2. The method as recited in claim 1, wherein the community space for the video is generated upon an initial streaming of the video.

3. The method as recited in claim 1, wherein the video is one or more of a movie, a television show, a sportscast, an independent video, and a computer-generated video.

4. The method as recited in claim 1, wherein some of the plurality of data items includes digital data for one or more of a text message, an image, a graphic, a photograph, an audio recording, a video clip, and a music file.

5. The method as recited in claim 1, further comprising: directing display of the dynamic data item on the computing device of the requesting account holder in accordance with a time of relevance of the dynamic data item during playback of the video.

6. The method as recited in claim 1, wherein the plurality of data items are displayed on the computing device of the requesting account holder simultaneously with the playback of the video.

7. The method as recited in claim 1, further comprising:
receiving an additional data item from one or more contributing account holders during streaming of the video to the computing device of the requesting account holder, the additional data item having metadata including a time of relevance of the additional data item during playback of the video;

storing the additional data item and associated metadata within the community space in correlation with the video; and transmitting the additional data item and associated metadata from the community space to the computing device of the requesting account holder in conjunction with continued streaming of the video to the computing device of the requesting account holder.

8. The method as recited in claim 1, further comprising: directing display of a container including the plurality of data items on the computing device of the requesting account holder, wherein the container is configured to provide for display navigation through the plurality of data items.

9. The method as recited in claim 8, wherein the container is displayed on the computing device of the requesting account holder simultaneously with the playback of the video.

10. The method as recited in claim 8, wherein the container is configured to provide a user-controllable sort of the plurality of data items by one or more of time of relevance of data item during video playback, contributing account holder, data item type, fan-rating, geographic location of contributing account holder, and group association of contributing account holder.

11. The method as recited in claim 8, wherein the container is configured to provide a text search tool to enable searching through the plurality of data items for user-specified textual content.

12. The method as recited in claim 8, wherein the container is configured to enable user-selection of any of the plurality of data items, and wherein the method further includes making a current playback time of the video equal the time of relevance within the metadata of a currently selected data item within the container.

13. The method as recited in claim 1, further comprising:
directing display of the given data item on the computing device of the requesting account holder in accordance with the time of relevance the given data item during playback of the video and at the pixel position to which the given data item is correlated.

14. The method as recited in claim 1, further comprising:
receiving a specification of one or more data item filter parameters from the requesting account holder;
filtering the plurality of data items stored within the community space in accordance with the specification of one or more data item filter parameters to identify a set of filtered data items,
transmitting the set of filtered data items and associated metadata correlated with the video to the computing device of the requesting account holder.

15. The method as recited in claim 14, wherein the one or more data item filter parameters include one or more of time of relevance of data item during video playback, contributing account holder, data item type, fan-rating, geographic location of contributing account holder, and group association of contributing account holder.

16. The method as recited in claim 1, wherein the associated metadata of the dynamic data item includes a time of relevance of the dynamic data item during playback of the video, and wherein the associated metadata of the dynamic data item includes a history of the set of correlated data items.

17. The method as recited in claim 1, wherein each data item in the set of correlated data items includes some type of similar content.

18. The method as recited in claim 1, wherein the dynamic data item is a consolidation of at least two of the plurality of data items.

19. The method as recited in claim 1, wherein the dynamic data item is a new composition based on at least two of the plurality of data items.

20. The method as recited in claim 1, wherein the dynamic data item moves in conjunction with movement of an object within the video.

21. A method, comprising:
establishing a community space for a video;

receiving a plurality of data items associated to the video from at least one contributing account holder, the plurality of data items being separate from the video, each of the plurality of data items including metadata specifying a time of relevance of the data item within the video, and an identity of the contributing account holder of the data item, wherein the plurality of data items includes a tagged data item received by tagging of the tagged data item to an object displayed in a scene of the video, the tagged data item having associated metadata that includes tag data defining the tagging of the tagged data item to the object;

storing the plurality of data items and metadata within the community space in correlation with the video;

receiving a streaming request for the video from a requesting account holder;

streaming the video to a computing device of the requesting account holder in response to the streaming request; and transmitting the plurality of data items and associated metadata from the community space to the computing device of the requesting account holder in conjunction with streaming the video, wherein the tagged data item is displayed in conjunction with the object on the computing device of the requesting account holder during playback of the video.

22. The method as recited in claim 21, further comprising:

operating a machine learning module to correlate multiple data items of the plurality of data items into a set of correlated data items;

operating the machine learning module to determine a subject or a theme of the set of correlated data items;

generating a dynamic data item and associated metadata that conveys the determined subject or theme of the set of correlated data items;

storing the dynamic data item and associated metadata within the community space in correlation with the video; and transmitting the dynamic data item and associated metadata from the community space to the computing device of the requesting account holder in conjunction with streaming the video.

\* \* \* \* \*